US007566069B1

(12) United States Patent
Ortega et al.

(10) Patent No.: US 7,566,069 B1
(45) Date of Patent: Jul. 28, 2009

(54) PORTABLE SHOPPING CART

(76) Inventors: Francisco E. Ortega, 123 Cameron Ct., Weston, FL (US) 33326; Walter Rodriguez, 1443 Garden Rd., Weston, FL (US) 33326

( * ) Notice: Subject to any disclaimer, the term of this patent is extended or adjusted under 35 U.S.C. 154(b) by 138 days.

(21) Appl. No.: 11/861,467

(22) Filed: Sep. 26, 2007

(51) Int. Cl.
*B62B 3/10* (2006.01)
(52) U.S. Cl. .................. 280/652; 280/651; 280/639; 280/638; 280/32.6; 280/47.25
(58) Field of Classification Search ................. 280/651, 280/639, 638, 32.6, 47.25
See application file for complete search history.

(56) References Cited

U.S. PATENT DOCUMENTS

| | | | |
|---|---|---|---|
| 4,114,915 A * | 9/1978 | Lello et al. ............. 280/47.19 |
| 4,248,453 A * | 2/1981 | Stark ..................... 280/655 |
| 4,678,195 A | 7/1987 | Trubiano | |
| 4,826,186 A | 5/1989 | Hagelin | |
| 4,896,897 A * | 1/1990 | Wilhelm ................. 280/655 |
| 5,106,112 A * | 4/1992 | Sargent .................. 280/40 |
| 5,203,579 A | 4/1993 | Lipschitz | |
| 5,547,205 A * | 8/1996 | do Rosario Sousa de Cabedo ............. 280/30 |
| D406,430 S | 3/1999 | Ross | |
| 6,708,991 B1 * | 3/2004 | Ortlieb .................. 280/47.26 |
| 6,827,364 B1 | 12/2004 | Martin | |

* cited by examiner

*Primary Examiner*—Christopher P Ellis
*Assistant Examiner*—Cynthia F Collado
(74) *Attorney, Agent, or Firm*—Crossley Patent Law; Mark A. Crossley

(57) ABSTRACT

A portable shopping cart that allows an individual to both collect items when shopping and then conveniently store the shopping cart when done by folding it up into a small, packable space. The shopping cart includes a lower mounted platform that can be folded up against a stand when the shopping cart is not in use. Furthermore, the shopping cart includes a telescoping stand that supports a pair of handlebars for properly grasping and steering the shopping cart when it is being used. An extendible arm is attached to the telescoping stand for pushing the cart and for hanging items from the arm over the platform, along with a basket that is attached to the telescoping stand for general storage needs.

3 Claims, 8 Drawing Sheets

PORTABLE SHOPPING CART

BACKGROUND OF THE INVENTION

The present invention concerns that of a new and improved portable shopping cart that allows an individual to both collect items when shopping and then conveniently store the shopping cart when done by folding it up into a small, packable space.

DESCRIPTION OF THE PRIOR ART

U.S. Pat. No. D406,430, issued to Ross, discloses an ornamental design for a shopping cart.

U.S. Pat. No. 4,826,186, issued to Hagelin, discloses a hand-pushed carrier trolley which is equipped with a front pair of swiveling wheels.

U.S. Pat. No. 6,827,364, issued to Martin, discloses a personal utility cart.

U.S. Pat. No. 5,203,579, issued to Lipschitz, discloses a clothes shopping cart.

U.S. Pat. No. 4,678,195, issued to Trubiano, discloses a shopping cart apparel hanger.

SUMMARY OF THE INVENTION

The present invention concerns that of a new and improved portable shopping cart that allows an individual to both collect items when shopping and then conveniently store the shopping cart when done by folding it up into a small, packable space. The shopping cart includes a lower mounted platform that can be folded up against a stand when the shopping cart is not in use. Furthermore, the shopping cart includes a telescoping stand that supports a pair of handlebars for properly grasping and steering the shopping cart when it is being used. An extendible arm is attached to the telescoping stand for hanging items from the arm over the platform, along with a basket that is attached to the telescoping stand for general storage needs. An elastic cord is attached to the end of the extendible arm to securely fasten items to the arm. A plurality of hangers are provided for also hanging items from the extendible arm for convenient removal of the items without the need to remove other items hanging therefrom.

There has thus been outlined, rather broadly, the more important features of a portable shopping cart that the detailed description thereof that follows may be better understood and in order that the present contribution to the art may be better appreciated. There are, of course, additional features of the portable shopping cart that will be described hereinafter and which will form the subject matter of the claims appended hereto.

In this respect, before explaining at least one embodiment of the portable shopping cart in detail, it is to be understood that the portable shopping cart is not limited in its application to the details of construction and to the arrangements of the components set forth in the following description or illustrated in the drawings. The portable shopping cart is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present portable shopping cart. It is important, therefore, that the claims be regarded as including such equivalent constructions insofar as they do not depart from the spirit and scope of the present invention.

An object of the present portable shopping cart is to provide a shopping cart which is easily transported by an individual.

Another object of the present portable shopping cart is to provide a shopping cart which is foldable and conveniently transported in a vehicle.

Still another object of the present portable shopping cart is to provide a shopping cart which may be used for multiple shopping needs, including a variety of storage means for various sizes, shapes, and types of items, cup holders, and storage space for a shopper's personal accessories.

Still yet another object of the present portable shopping cart is to provide a shopping cart which will transport a child while shopping.

Even still another object of the present portable shopping cart is to provide a shopping cart with enhanced maneuverability.

Yet even another object of the present cart is to provide a means for securing items onto the cart to prevent theft or accidental loss of the items.

Still even yet another object is to provide a means for hanging items while providing for convenient removal of items without having to remove other items.

An additional object of the present invention to provide a portable shopping cart which has all of the advantages of the prior art and none of the disadvantages.

It is a further object of the present invention to provide a portable shopping cart which may be easily and efficiently manufactured and marketed.

It is an even further object of the present invention to provide a portable shopping cart which is of durable and reliable construction.

It is still even a further object of the present invention to provide a portable shopping cart which is economically affordable and available for relevant market segment of the purchasing public.

Other objects, features and advantages of the present invention will become more readily apparent from the following detailed description of the preferred embodiment when considered with the attached drawings and appended claims.

DESCRIPTION OF THE PREFERRED EMBODIMENT

Figure 1:
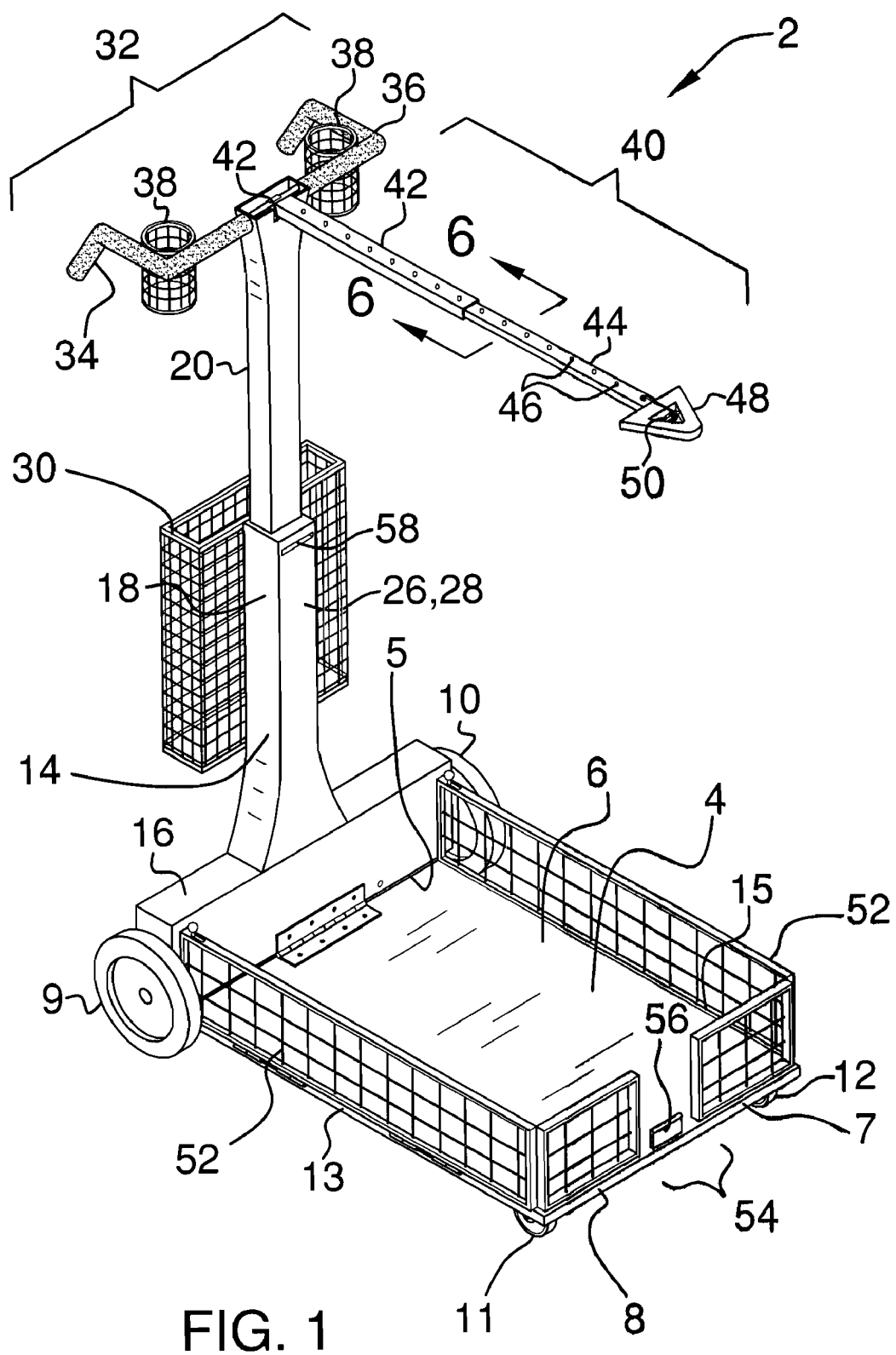
FIG. 1 shows a front perspective view of the portable shopping cart as it would appear with the platform lowered.
Figure 2:
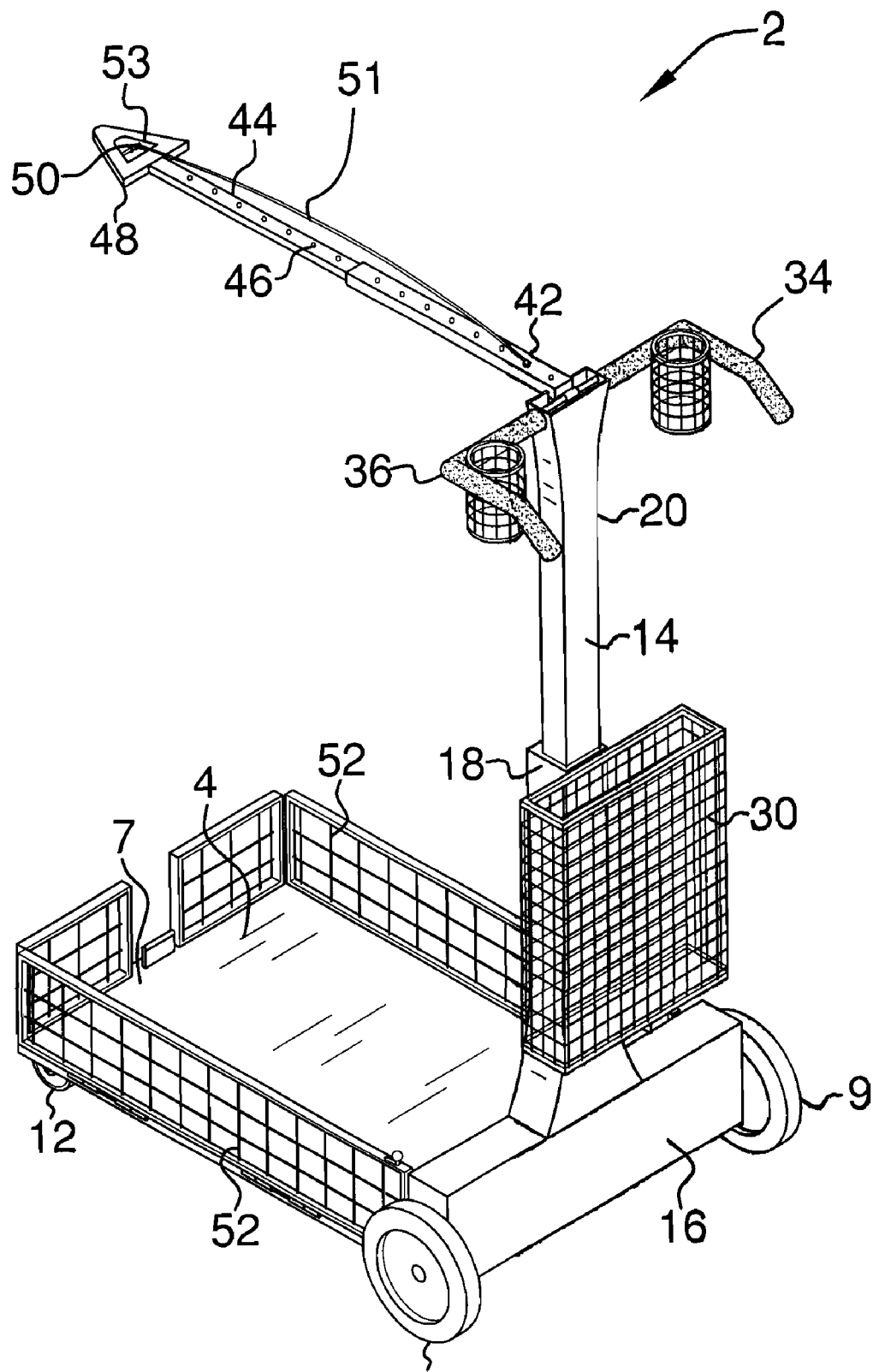
FIG. 2 shows a rear perspective view of the portable shopping cart as it would appear with the platform lowered.
Figure 3:
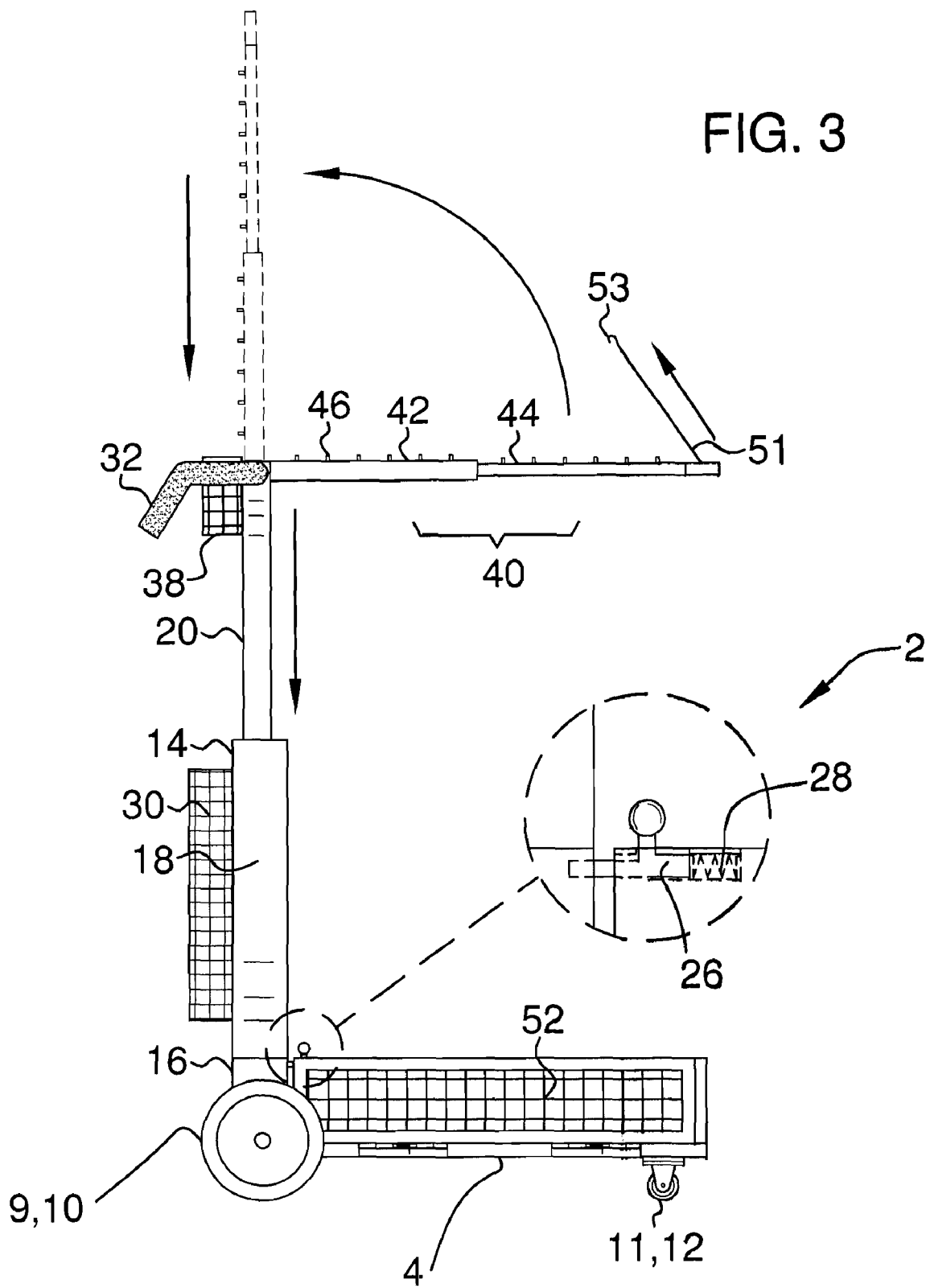
FIG. 3 shows a side view of the portable shopping cart as it would appear with the platform lowered.
Figure 4:
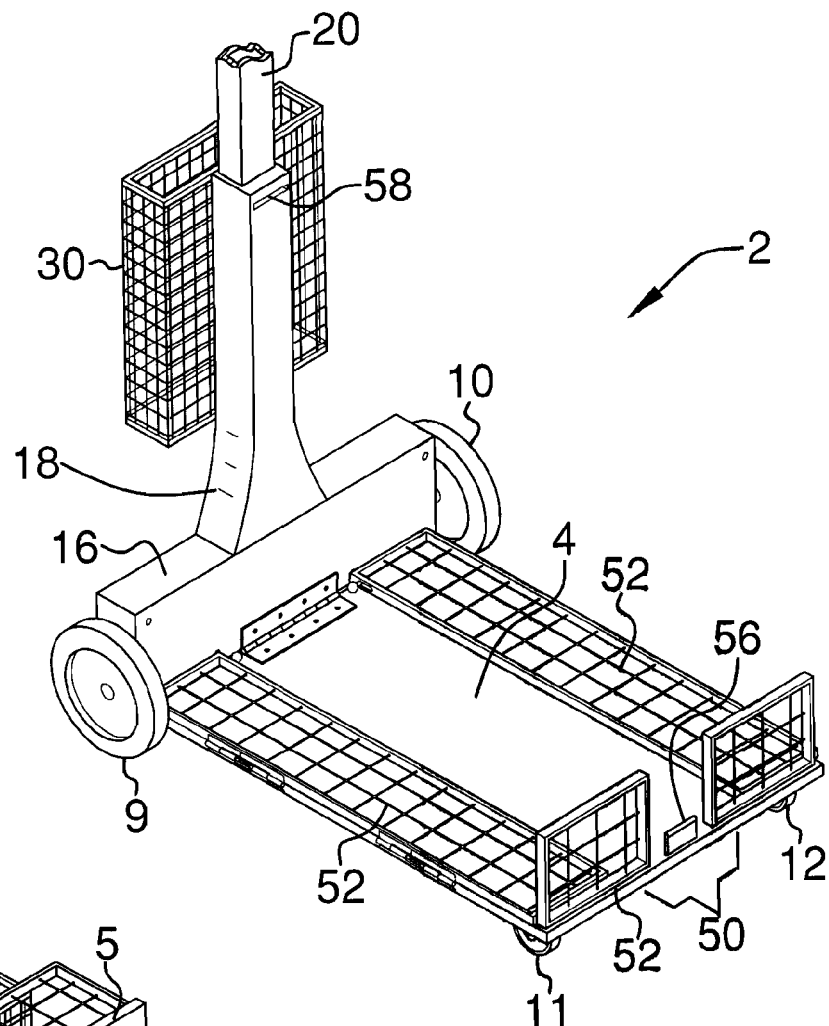
FIG. 4 shows a front perspective view of the portable shopping cart as it would appear with the platform lowered as it is being folded up and placed into storage.
Figure 5:
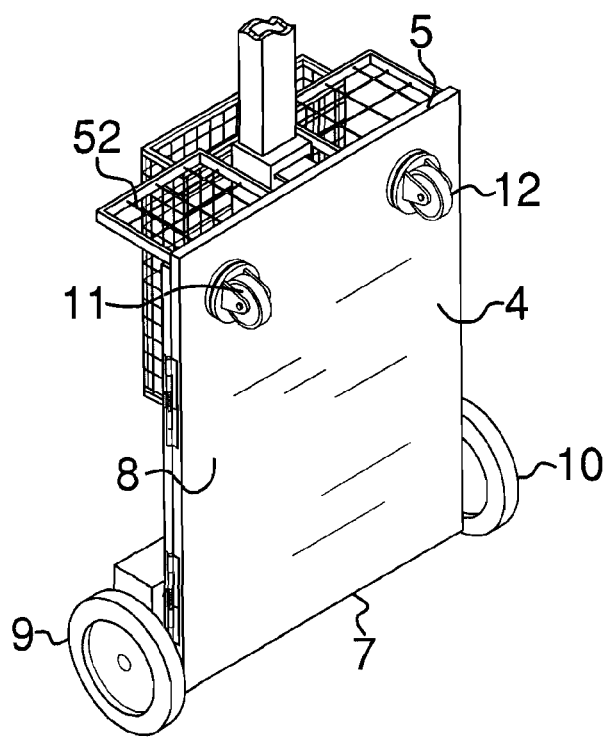
FIG. 5 shows a front perspective view of the portable shopping cart as it would appear with the platform raised as it is being folded up and placed into storage.
Figure 6:
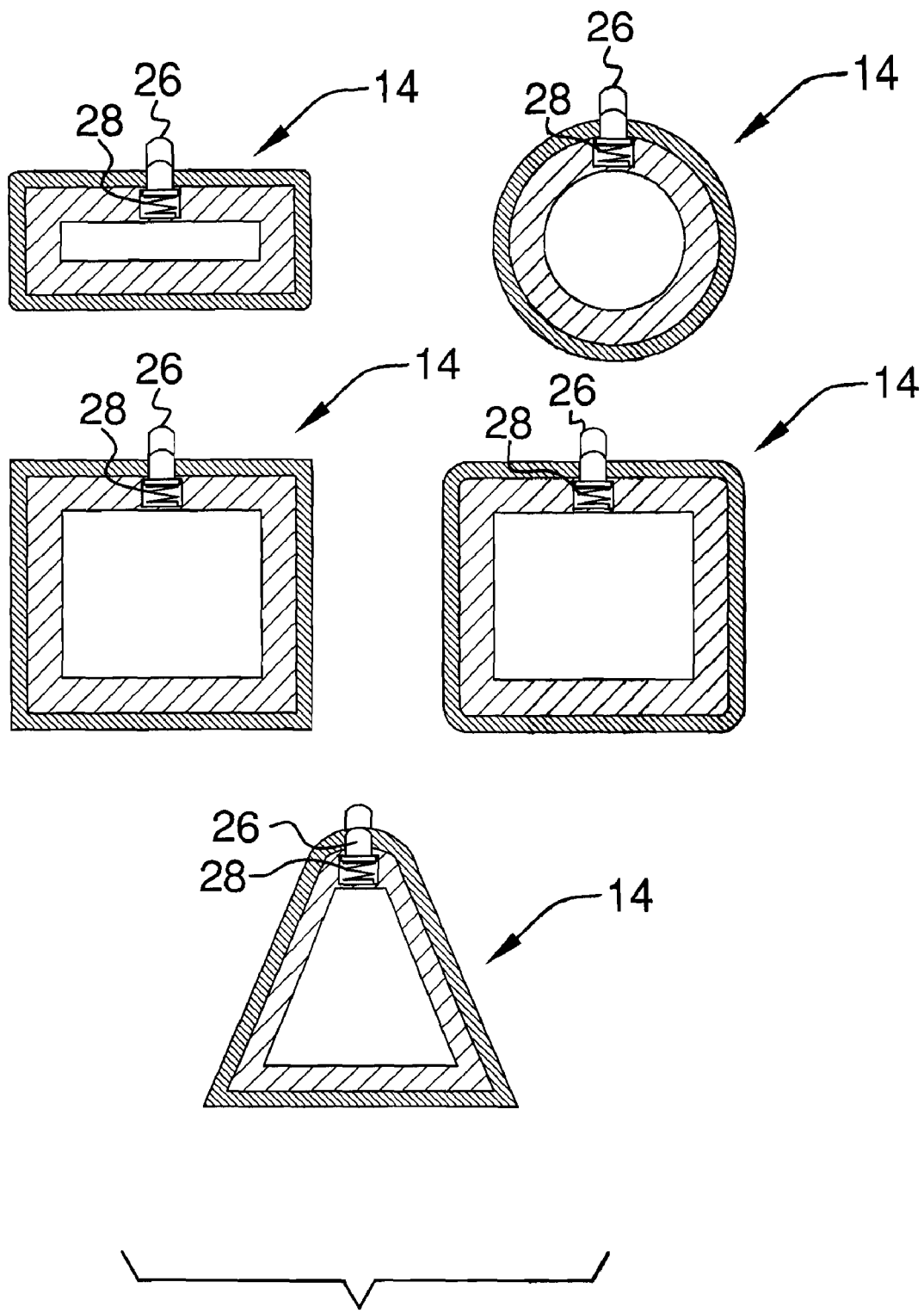
FIG. 6 shows cross-sections of various embodiments of the extendible arm that is used with the portable shopping cart.
Figure 7:
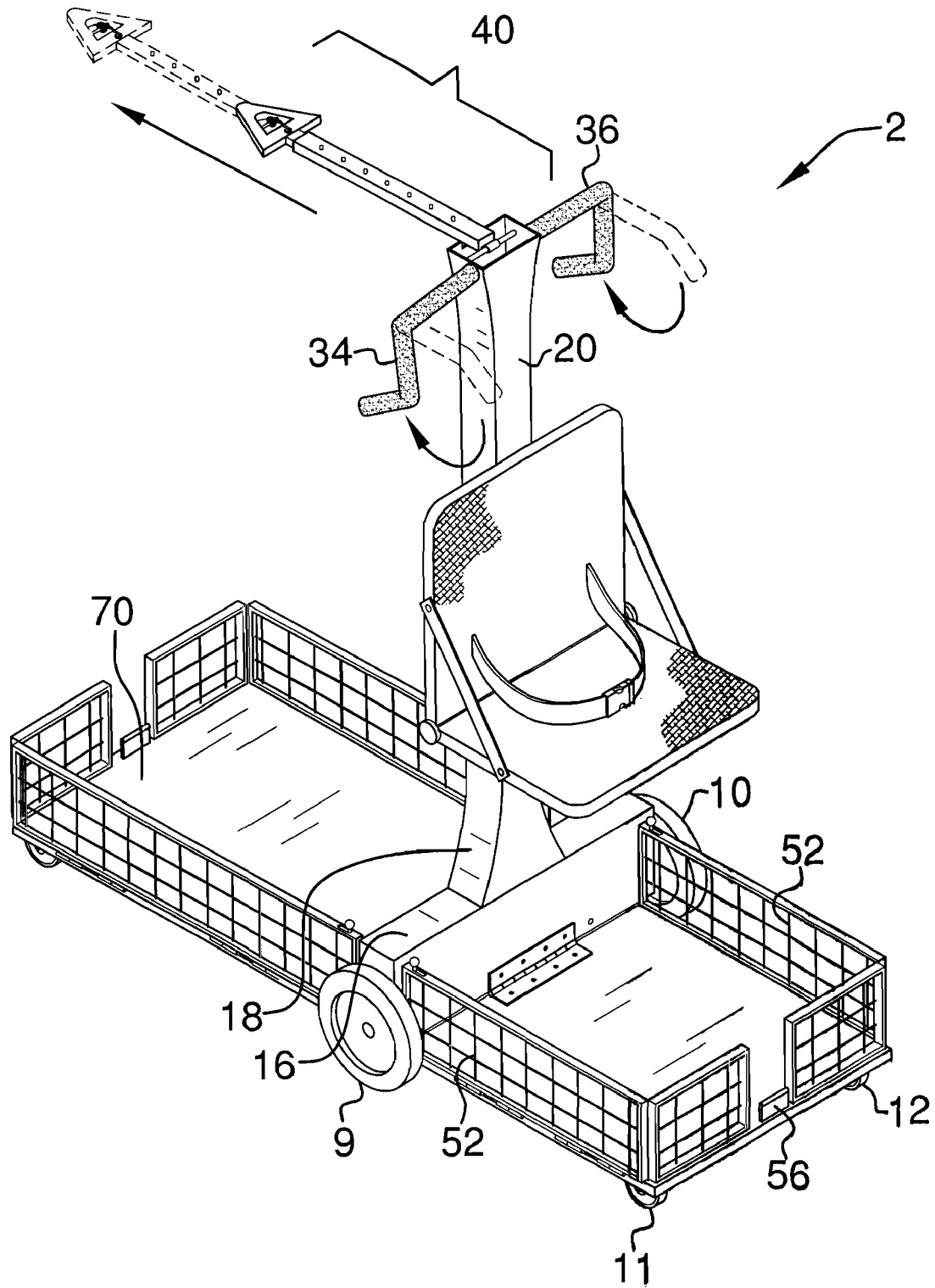
FIG. 7 shows a front perspective view of a first alternative embodiment of the portable shopping cart as it would appear with the platform lowered.
Figure 8:
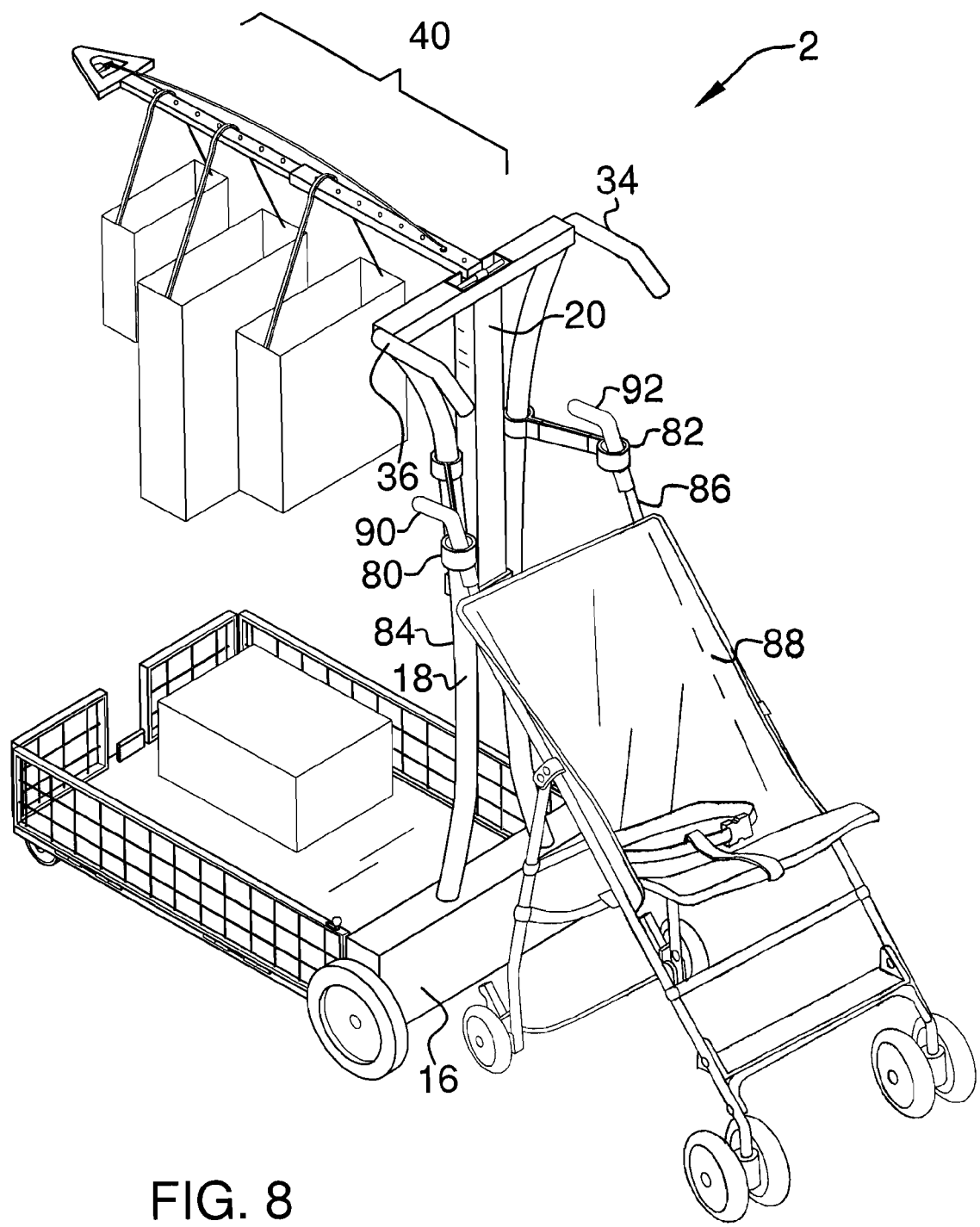
FIG. 8 shows a front perspective view of a second alternative embodiment of the portable shopping cart as it would appear with the platform lowered.

With reference now to the drawings, and in particular to FIGS. 1 through 9 thereof, a new portable shopping cart embodying the principles and concepts of the present invention and generally designated by the reference numeral 2 will be described.

As best illustrated in FIGS. 1 through 9, the portable shopping cart 2 comprises a platform 4 that has two surfaces comprising a top surface 6 and a bottom surface 8. Furthermore, the platform 4 includes two ends comprising a first end 5 and a second end 7, and also has two edges comprising a first edge 13 and a second edge 15. A quartet of wheels 9, 10, 11, 12 are attached to the bottom surface 8 of the platform 4. Two of the wheels 9 and 10 are forward-facing wheels only, while wheels 11 and 12 are preferably caster-style wheels that can swivel about, thereby increasing maneuverability when the shopping cart 2 is in use.

A stand 14 is the main structural support for the shopping cart 2. The stand 14 comprises a base 16, a vertical mount 18, and a telescoping support 20. The vertical mount 18 and telescoping support 20 each have two ends comprising a top end and a bottom end. The base is pivotally attached to the first end 5 of the platform 4 and is supported by two oversized wheels 22 and 24. The bottom end of the vertical mount 18 is fixedly mounted on the base 16, with the bottom end of the telescoping support 20 being insertable into the top end of the vertical mount 18. A spring pin 26 and a spring 28 are used to hold the telescoping support 20 in place, relative to the vertical mount 18, once the telescoping support 20 has been placed at a desired height. The spring pin 26 is externally attached to the telescoping support 20, with the spring 28 being located within the telescoping support 20.

The shopping cart 2 also includes a basket 30 that is attached to the vertical mount 18 portion of the stand 14. The basket 30 is used to store various items, including paperwork, as needed.

A pair of handlebars 32 are attached to the top end of the telescoping support 20, with the pair of handlebars 32 comprising a right handlebar 34 and a left handlebar 36. Each handlebar has a small, cylindrical basket 38 that is attached to it to allow for storage as needed.

An extendible arm 40 is attached to the top end of the telescoping support 20, with the extendible arm 40 comprising a base 42 and a telescoping portion 44. The base 42 is pivotally attached to the top end of the telescoping support 20, with the telescoping portion 44 of the extendible arm 40 being insertable into the base 42 of the extendible arm 40. A plurality of pegs 46 located on both the base 42 and the telescoping portion 44 of the extendible arm 40 can be used strap things around, such as items on string and rope, when shopping using the shopping cart 2. The arm 40 may be constructed in various cross-sectional shapes.

The telescoping portion 44 of the extendible arm 40 has an attachment 48 that includes a central cutout 50. The central cutout 50 can be used to hang things that have string or rope onto the attachment 48 and can also be used to grab onto the attachment 48 to pull and steer the shopping cart 10. An elastic cord 51 is connected to the attachment 48 and has a hook 53 at distal end of the cord 51 for connecting the cord 51 to one of the pegs 46 to ensure that various items hanging on the base 42 or telescoping portion of the extendible arm 40 are securely fastened to the extendible arm 40 to prevent the items from accidentally falling off of the extendible arm 40 and to prevent theft of such items.

The top surface of the platform 4 has wire siding 52 pivotally attached to both the first edge 13 and the second edge 15 to hold groceries and other items on the platform 4. In addition, the second end of the platform 4 has wire siding 52 attached, with a centrally located cutout 54 within the wire siding to allow the platform to be folded up and placed against the stand 14. Before this is done, the wire siding 52 attached to the first edge 13 and the second edge 15 is folded down against the top surface of the platform 4. Then, the platform 4 is folded up and placed against the stand 14. A male lock piece 56, located on the top surface of the platform 4 near the second end of the platform 4 within the cutout 54, is placed into a female insert 58 that is located on the vertical mount 18 of the stand 14. These interlocking pieces will hold the platform 4 in a vertical position against the stand 14 until it is pulled away by an individual.

The stand 14 can have various cross-sectional shapes. These shapes are highlighted in FIG. 6. A spring pin 62 and a spring 64 are used to hold the platform 4 in a horizontal position, relative to the base 16 of the stand 14, once the platform 4 has been lowered and is ready for use.

An alternative embodiment of the shopping cart 2 can include a second, foldable back basket 70 that is used in addition to the platform 4 and wire siding 52 that is already present. Yet another alternative embodiment of the shopping cart 2 can include a pair of stroller attachments 80 and 82 that are attached to separate support mounts 84 and 86, with a stroller 88 capable of being attached to the stroller attachments 80 and 82 through its handles 90 and 92.

Figure 9:
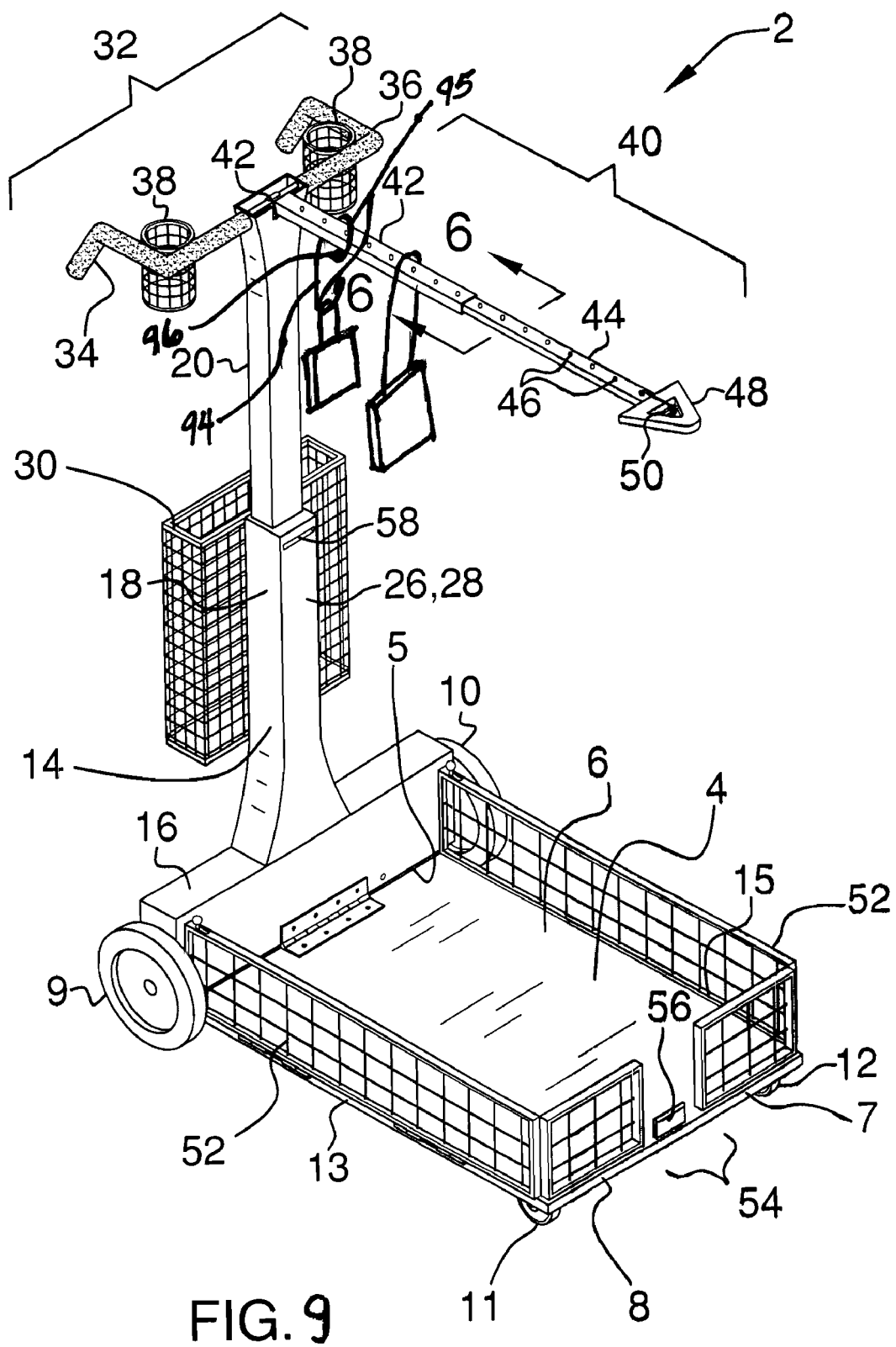
FIG. 9 is a front perspective view of the portable shopping cart as it would appear with the platform lowered and illustrating a hanger in use for hanging an item from an extendible arm.

As illustrated in FIG. 9, another alternative embodiment of the shopping cart 2 may include a plurality of hangers 94 for hanging items from the extendible arm 40 for convenient removal of the items without the need to remove other items hanging therefrom. Each hanger 94 preferably has curved ends 95 and a head 96 on each of the ends 95 to prevent an item from slipping off of the hanger 94.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A portable shopping cart comprising:
    (a) a platform having two surfaces comprising a top surface and a bottom surface, the platform further comprising two ends comprising a first end and a second end, the platform further comprising two edges comprising a first edge and a second end,
    (b) a stand, wherein the platform is pivotally attached to the stand, wherein the stand further comprises (i) a base, wherein the first end of the platform is pivotally attached to the base, (ii) a pair of wheels attached to the base, (iii) a vertical mount having two ends comprising a top end and a bottom end, the bottom end of the vertical mount being fixedly attached to the base, (iv) a telescoping support having two ends comprising a top end and a bottom end, the bottom end of the telescoping support being insertable into the top end of the vertical mount, and (v) means for retaining the telescoping support in a fixed position in relation to the vertical mount, said means further comprising (1) a spring located within the telescoping support, (2) a spring pin attached to the spring located within the telescoping support, (3) wherein an individual can set the position of the telescoping support in relation to the vertical mount by setting the spring pin, (c) means for mounting the platform, said means further comprising a quartet of wheels, wherein each of the wheels of the quartet of wheels is attached to the bottom surface of the platform, further wherein at least two of the wheels of the plurality of wheels are caster wheels, and (d) means for steering the platform, said means further comprising (i) a pair of handlebars comprising a right handlebar and a left handlebar, (ii) wherein each of the handlebars of the pair of handlebars is attached to the top end of the telescoping support, (e) a pair of cylindrical baskets comprising a left cylindrical basket and a right cylindrical basket, wherein the left cylindrical basket is attached to the left handlebar, further wherein the right cylindrical basket is attached to the right handlebar, (f) a basket attached to the vertical mount of the stand, (g) an extendible arm, the extendible arm being pivotally attached to the top end of the telescoping support, wherein the extendible arm further comprises (i) a base pivotally attached to the top end of the telescoping support, (ii) a telescoping portion insertable into the base, (iii) a plurality of pegs attached to both the base and the telescoping portion of the extendible arm, (iv) a support attachment attached to the telescoping portion, the support attachment including a central cutout, (h) a length of wire siding attached to the top surface of the platform along the first edge of the platform, (i) a length of wire siding attached to the top surface of the platform along the second edge of the platform, (j) a length of wire siding attached to the top surface of the platform along the second end of the platform, (k) means for removably attaching the second end of the platform to the stand, said means further comprising (i) a cutout located in the wire siding located on the second end of the platform, (ii) a male lock piece located on the top surface of the platform near the second end of the platform, the male lock piece being located in the cutout located in the wire siding located on the second end of the platform, (iii) a female insert located on the vertical mount of the stand, (iv) wherein the platform can be folded up until the male lock piece is removably inserted into the female insert.

2. The portable shopping cart of claim 1 further comprising an elastic cord connected to the central cutout of the support attachment at one end and having a hook at an opposite end for connecting the cord to a peg in order to securely fasten an item to the extendible arm.

3. The portable shopping cart of claim 2 further comprising a plurality of hangers having curved ends and a head on each of said curved end.

\* \* \* \* \*